(12) United States Patent
Kuo (10) Patent No.: US 9,243,748 B2
(45) Date of Patent: Jan. 26, 2016

(54) GREASE GUN WITH A QUICK-RELEASE END COVER

(71) Applicant: Shuoxing Metal Products (Kunshan) CO., LTD., Jiangsu (CN)

(72) Inventor: Wen-I Kuo, Jiangsu (CN)

(73) Assignee: SHUOXING METAL PRODUCTS (KUNSHAN) CO., LTD., Kunshan, Jiangsu (CN)

( * ) Notice: Subject to any disclaimer, the term of this patent is extended or adjusted under 35 U.S.C. 154(b) by 73 days.

(21) Appl. No.: 14/185,838

(22) Filed: Feb. 20, 2014

(65) Prior Publication Data

US 2015/0233524 A1 Aug. 20, 2015

(51) Int. Cl.
*F16N 19/00* (2006.01)
*F16N 3/12* (2006.01)

(52) U.S. Cl.
CPC . *F16N 19/00* (2013.01); *F16N 3/12* (2013.01)

(58) Field of Classification Search
CPC ...... F16N 3/12; F16N 19/00; Y10T 29/49947
USPC .......................... 222/191, 256, 325–327, 386; 184/105.2, 28
See application file for complete search history.

(56) References Cited

U.S. PATENT DOCUMENTS

| 1,349,994 | A | * | 8/1920 | Wood | 222/179 |
| 4,601,412 | A | * | 7/1986 | Martin | 222/256 |
| 7,393,342 | B2 | * | 7/2008 | Henniges et al. | 604/187 |
| 2010/0116850 | A1 | * | 5/2010 | Weems et al. | 222/256 |

* cited by examiner

*Primary Examiner* — Kevin P Shaver
*Assistant Examiner* — Robert Nichols, II
(74) *Attorney, Agent, or Firm* — Patent Office of Bang Shia (57) ABSTRACT

A grease gun with a quick-release end cover includes a barrel, and an operating end cover and a piston end cover disposed at two ends of the barrel. Between the operating end cover and the barrel is disposed a quick-release device which includes: an annular groove formed around the barrel; a first hole formed in the operating end cover and includes an outer open end and an inner open end. Inside the first hole is formed an annular shoulder portion, in the outer open end of the first hole is formed a slot. A control member has a shaft inserted into the first hole, the shaft includes an abutting and an operating portion formed at two ends thereof, and a positioning pin. A compression spring is sleeved onto the shaft and pressed between the annular shoulder portion of the first hole, and the annular abutting portion of the abutting block.

12 Claims, 8 Drawing Sheets

GREASE GUN WITH A QUICK-RELEASE END COVER

BACKGROUND OF THE INVENTION

1. Field of the Invention

The present invention relates to a grease gun, and more particularly to a grease gun with a quick-release end cover.

2. Description of the Prior Art

Figure 1:
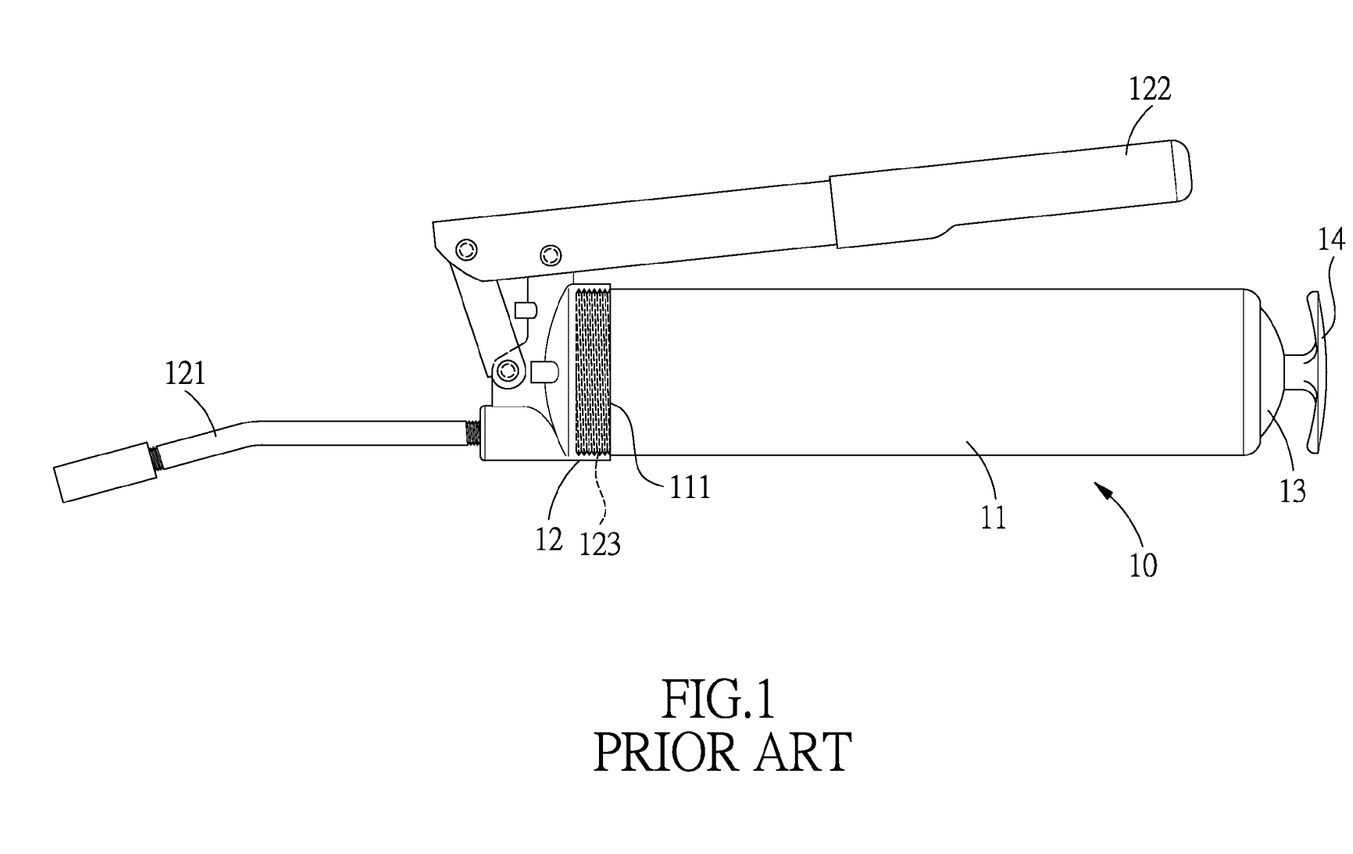
FIG. 1 shows a conventional grease gun.
Figure 2:
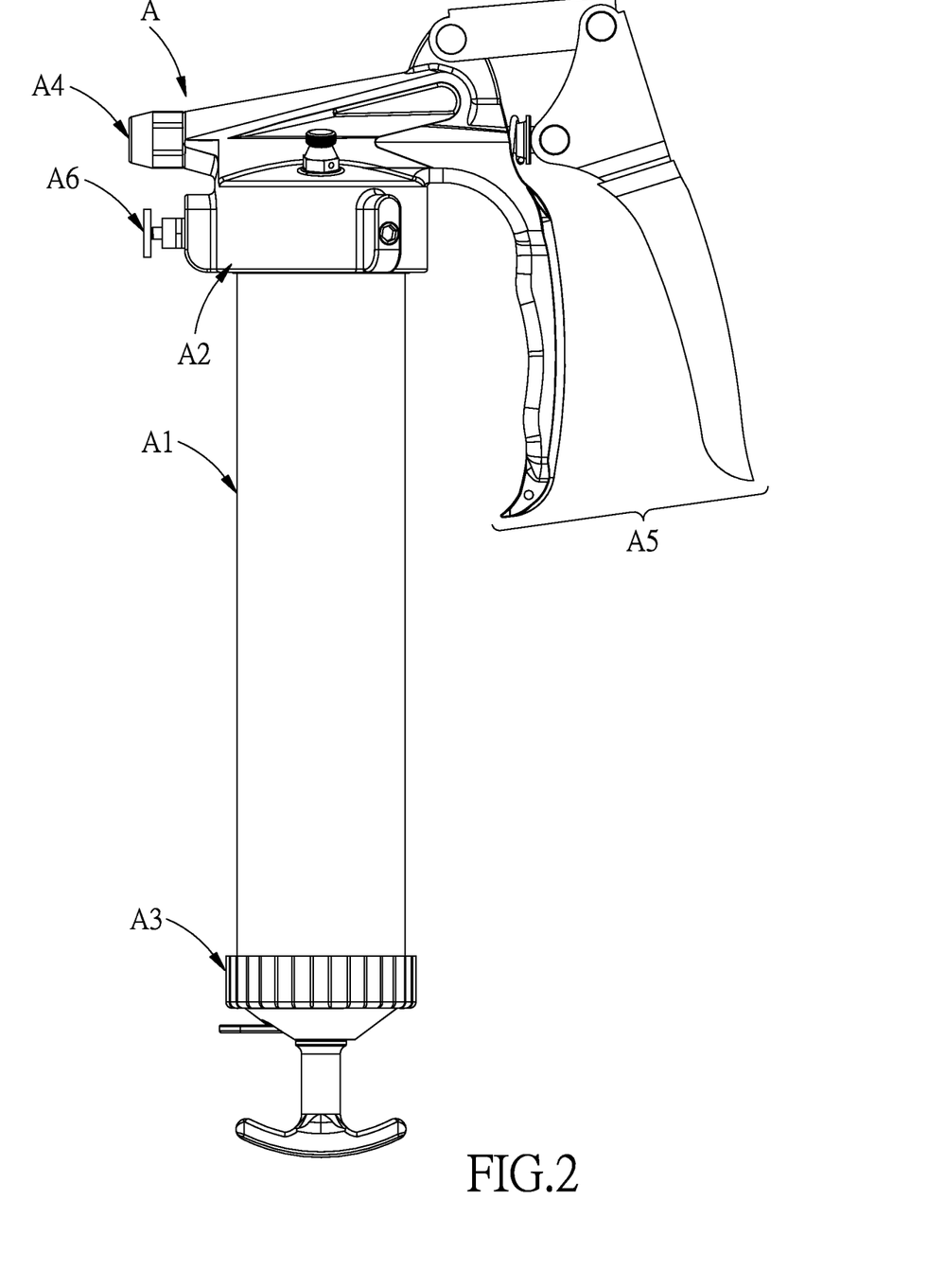
FIG. 2 shows a grease gun with a quick-release end cover in accordance with the present invention.
Figure 3:
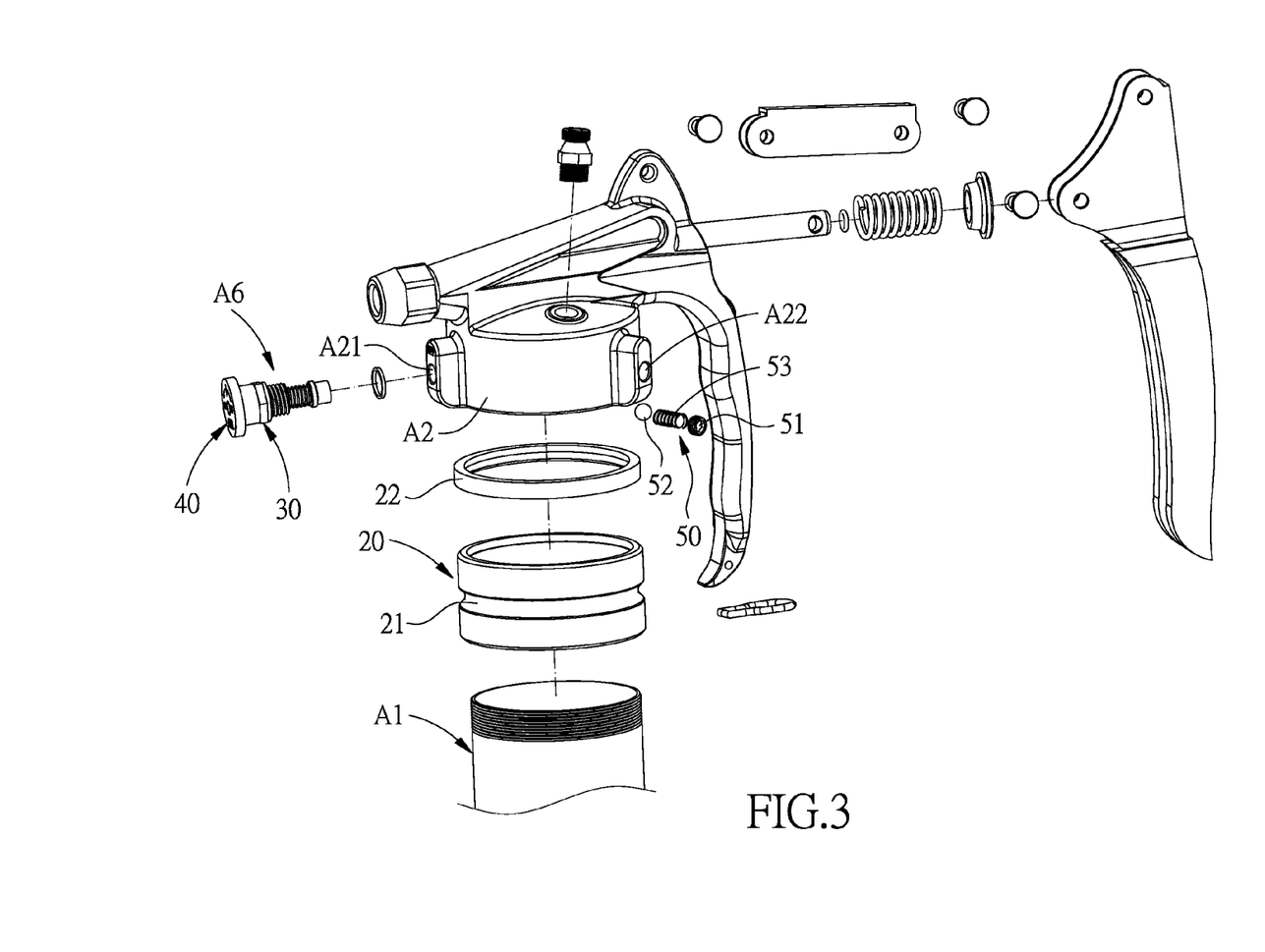
FIG. 3 is an exploded view of the front end of the grease gun in accordance with the present invention.
Figure 4:
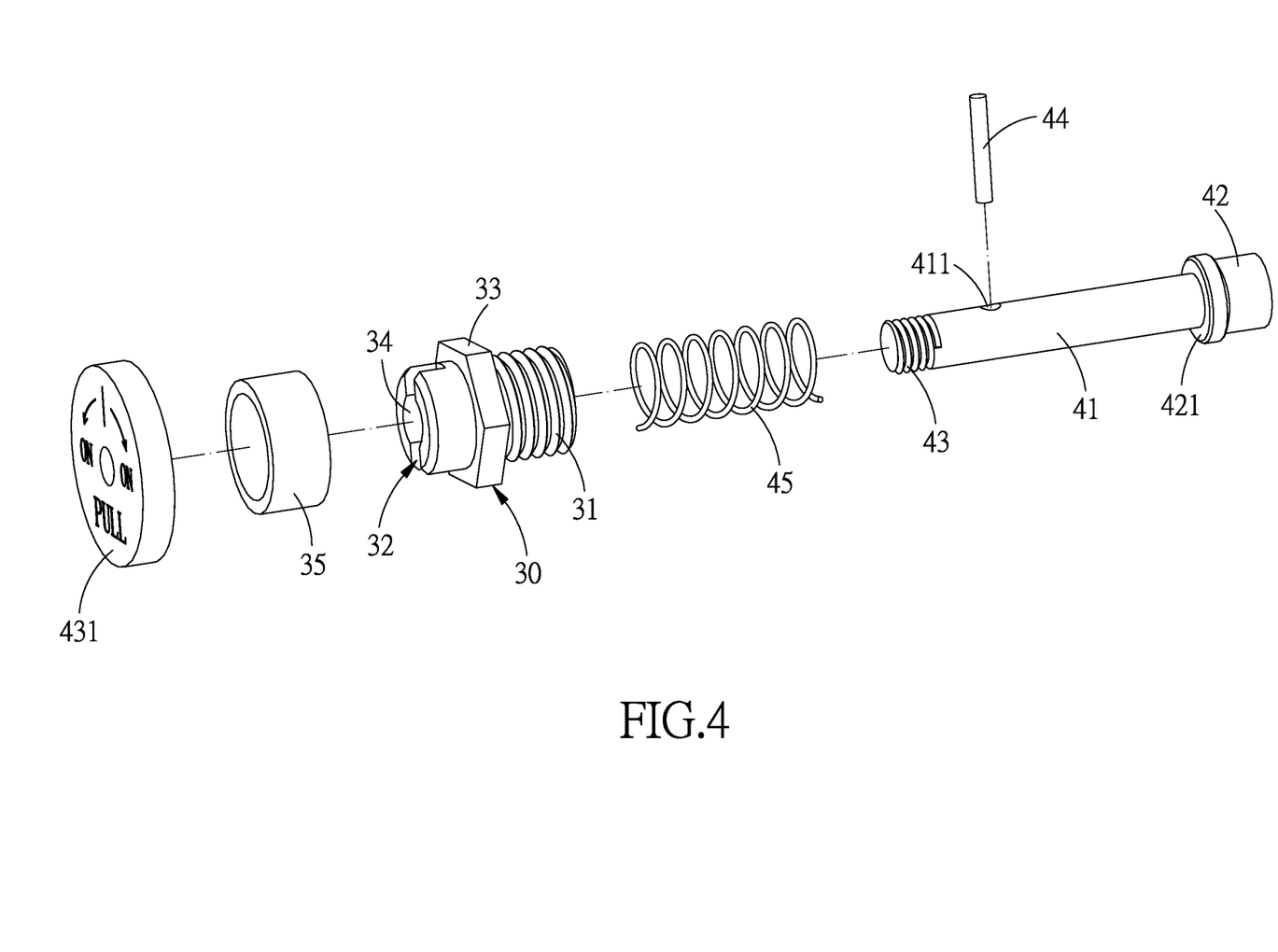
FIG. 4 is an exploded view of the grease gun with a quick-release end cover in accordance with the present invention.

FIG. 1 shows a conventional manually operated grease gun 10 which comprises a barrel 11 for storing grease, and a front end cover 12 and a rear end cover 13 screwed at two ends of the barrel 11. The front end cover 12 is provided with a dispensing tube 121 and a lever 122. A piston 14 is inserted through the rear end cover 13 and into the barrel 11 to push grease to the dispensing tube 121 by cooperating with the lever 122. The rear end of the conventional grease gun 10 is used to accommodate the piston 14, therefore, the grease is normally fed into the grease gun via the front end. Furthermore, as shown in FIG. 1, the front end of the barrel 11 is provided with an outer thread 111 for engaging with an inner thread 123 of the front end cover 12.

It is to be noted that the grease will be adhered to the inner surface of the barrel 11 and the front end cover 12 after being pushed by the piston, and the front end cover 12 needs to rotate when screwed to the barrel 11, as a result, the grease on the inner surface is likely to stick between the barrel 11 and the front end cover 12, when the front end cover 12 rotates, which not only affects the tightness of engagement between the barrel 11 and the front end cover 12, but also dirties the user when replacing the grease bar.

The present invention has arisen to mitigate and/or obviate the afore-described disadvantages.

SUMMARY OF THE INVENTION

The primary objective of the present invention is to provide a grease gun with a quick-release end cover, which is easy to operate, without the problem that the grease dirties the user's hands.

To achieve the above objective, a grease gun with a quick-release end cover in accordance with the present invention comprises: a barrel, and an operating end cover and a piston end cover disposed at two ends of the barrel, the grease gun is characterized in that: between the operating end cover and the barrel is disposed at least one quick-release device. The quick-release device comprises: an annular groove is formed around an outer surface of one end of the barrel; a first hole is formed in the operating end cover and includes an outer open end located toward an outer surface of the operating end cover, and an inner open end located toward an inner surface of the operating end cover, inside the first hole is formed an annular shoulder portion, in the outer open end of the first hole is formed a slot which is defined by two symmetrical meniscus structures; a control member includes a shaft inserted into the first hole of the operating end cover, the shaft has one end provided with an abutting block which is disposed in the first hole, and another end formed with an operating portion, the abutting block is formed with an annular abutting portion, the shaft is further provided with a positioning pin which is located close to the operating portion, a compression spring is sleeved onto the shaft and has two ends pushed against the annular shoulder portion of the first hole, and the annular abutting portion of the abutting block, respectively. When the positioning pin moves or rotates along with the shaft to engage in the slot, the abutting block will be pushed by the compression spring to move into the annular groove of the barrel, or, when the positioning pin disengages from the slot, the abutting block will be pushed by the compression spring to move out of the slot, so as to separate the barrel from the operating end cover.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 2-8, a grease gun A with a quick-release end cover in accordance with the present invention comprises: a barrel A1, and an operating end cover A2 and a piston end cover A3 which are disposed at two ends of the barrel A. The operating end cover A2 is provided with a nozzle A4 and a lever A5. Between the operating end cover A2 and the barrel A1 is disposed a quick-release device A6 which comprises: the barrel A1, the operating end cover A2, an engaging ring 20, a restricting member 30, a control member 40 and two positioning members 50.

The engaging ring 20 is screwed to the end of the barrel A1 where the operating end cover A2 is disposed. Around the outer surface of the engaging ring 20 is formed an annular groove 21 for engaging with the control member 40 and the two positioning members 50. In this embodiment, a sealing ring 22 is disposed between the outer surface of the engaging ring 20 and the inner surface of the operating end cover A2 to improve tightness of connection between the barrel A1 and the operating end cover A2 and to prevent leakage of grease.

The operating end cover A2 is provided three protrusions around the outer surface thereof, one of the protrusions is formed with a first hole A21, and each of another two protrusions is formed with a second hole A22. Each of the first and second holes A21, A22 includes an outer open end A23 located toward the outer surface of the operating end cover A2, and an inner open end A24 located toward the inner surface of the operating end cover A2.

The restricting member 30 has one end formed with a threaded section 31 for engaging with the outer open end A23 of the first hole A21 of the operating end cover A2, and another formed with a slot 32 which is formed by two symmetrical gaps defined by two symmetrical meniscus structures. The restricting member 30 is further provided with an annular rib 33 between the threaded section 31 and the slot 32. Inside the restricting member 30 is formed a two-step hole 34 which is provided with an annular shoulder portion 341 located at the conjunction between the threaded section 31 and the annular rib 33. In this embodiment, around the slot 32 of the restricting member 30 is disposed a sleeve 35 to enclose the slot 32.

The control member 40 includes a shaft 41 inserted through the two-step hole 34 of the restricting member 30 and into the first hole A21 of the operating end cover A2. The shaft 41 has one end provided with an abutting block 42 which is disposed in the first hole A21, and another end formed with an operating portion 43 which is screwed with a rotating button 431. The abutting block 42 is formed with an annular abutting portion 421. The shaft 41 is further provided with an insertion hole 411 for insertion of a positioning pin 44. The insertion hole 411 is located close to the operating portion 43 and extends in a direction perpendicular to an axial direction of the shaft 41. A compression spring 45 is sleeved onto the shaft 41 and has two ends pushed against the annular shoulder portion 341 of the two-step hole 34 of the restricting member 30, and the annular abutting portion 421 of the abutting block 42, respectively. When the positioning pin 44 moves or rotates along with the shaft 41 to engage in the slot 32, the abutting block 42 will be pushed by the compression spring 45 to move into the annular groove 21 of the barrel A1. Or, when the positioning pin 44 disengage from the slot 32, the abutting block 42 will be pushed by the compression spring 45 to move out of the slot 32.

The two positioning members 50 are disposed in the two second holes A22 of the operating end cover A2, and each include a stop block 51 disposed at the outer open end A23 of the second holes A22, a ball 52 disposed between the inner open end A24 of the second holes A22 and the annular groove 21 of the barrel A1, and a compression spring 53 disposed between the stop block 51 and the ball 52. The ball 52 has an outer diameter larger than an inner diameter of the inner open end A24 of each of the second holes A22, so that the ball 52 is pushed by the compression spring 53 to move into or out of the annular groove 21.

What mentioned above are the structures of the first preferred embodiment of the present invention, for a better understanding of the invention, its operating advantages and the specific objects attained by its uses, reference should be had to the following descriptive matter.

Figure 5:
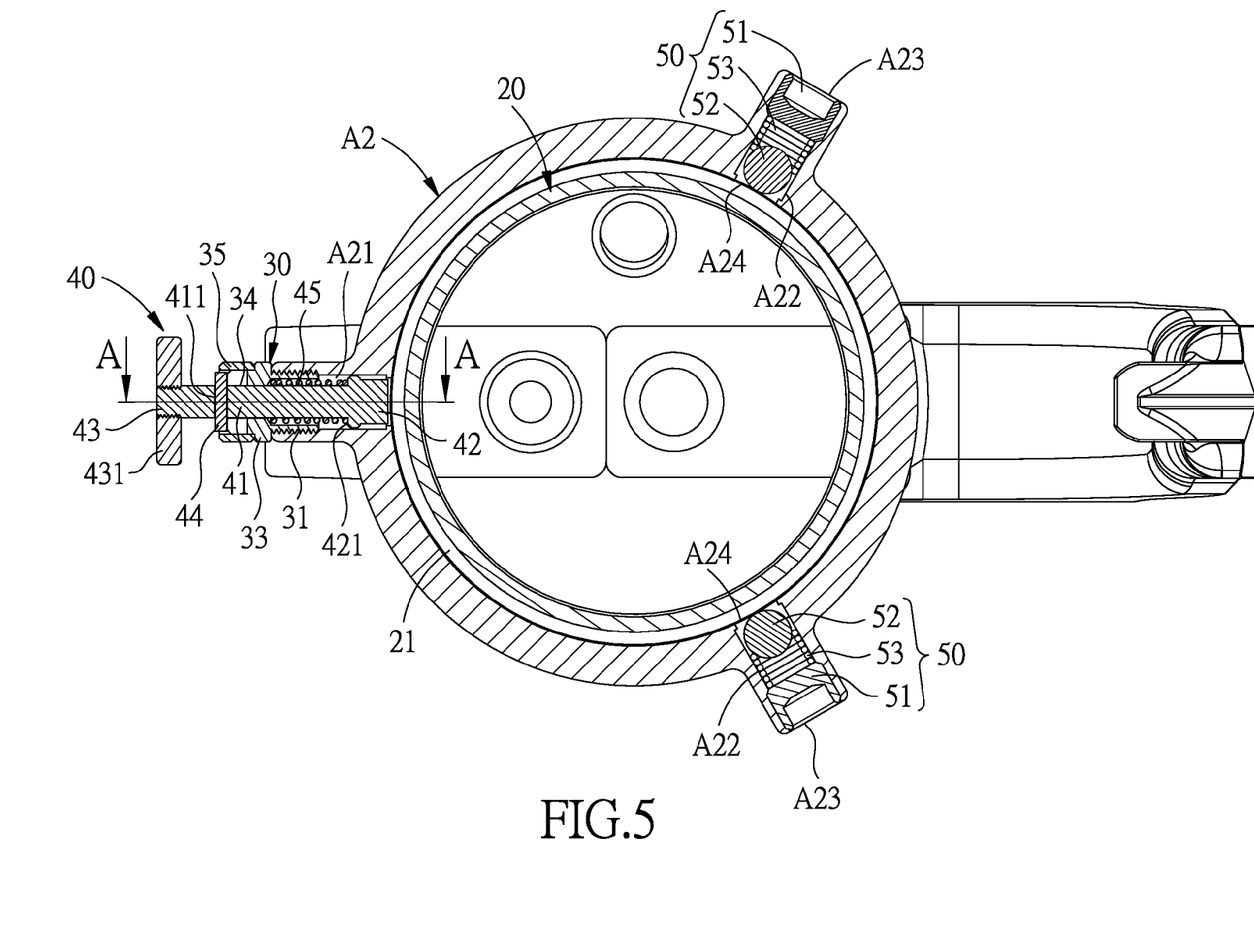
FIG. 5 is a cross sectional view of the grease gun with a quick-release end cover in accordance with the present invention, wherein the quick-release device is in a locked position.
Figure 6:
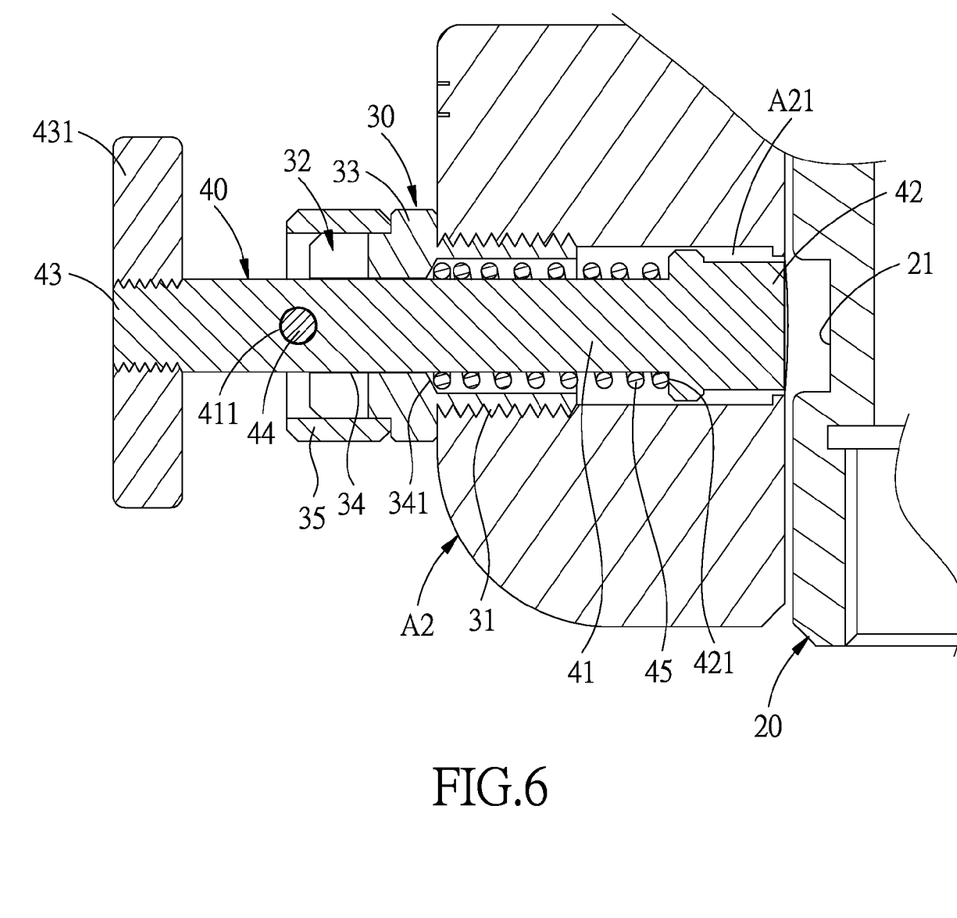
FIG. 6 is a cross sectional view taken along the line A-A of FIG. 5.

Referring then to FIG. 5-8, the compression spring 45 of the quick-release device A6 is decompressed under normal conditions, when the shaft 41 moves, it will compress the compression spring 45 while pushing the positioning pin 44 to move out of the slot 32, as shown in FIGS. 5 and 6. Then the positioning pin 44 rotates to a position misaligned with the slot 32 and engages with the two meniscus structures. Therefore, when the abutting block 42 of the control member 40 disengages from the annular groove 21 of the engaging ring 20, and the operating end cover A2 is pulled to separate from the barrel A1, the two positioning members 50 will be pushed into the second holes A22 of the operating end cover A2 to make it easy for the operating end cover A2 to disengage from the barrel A1.

Figure 7:
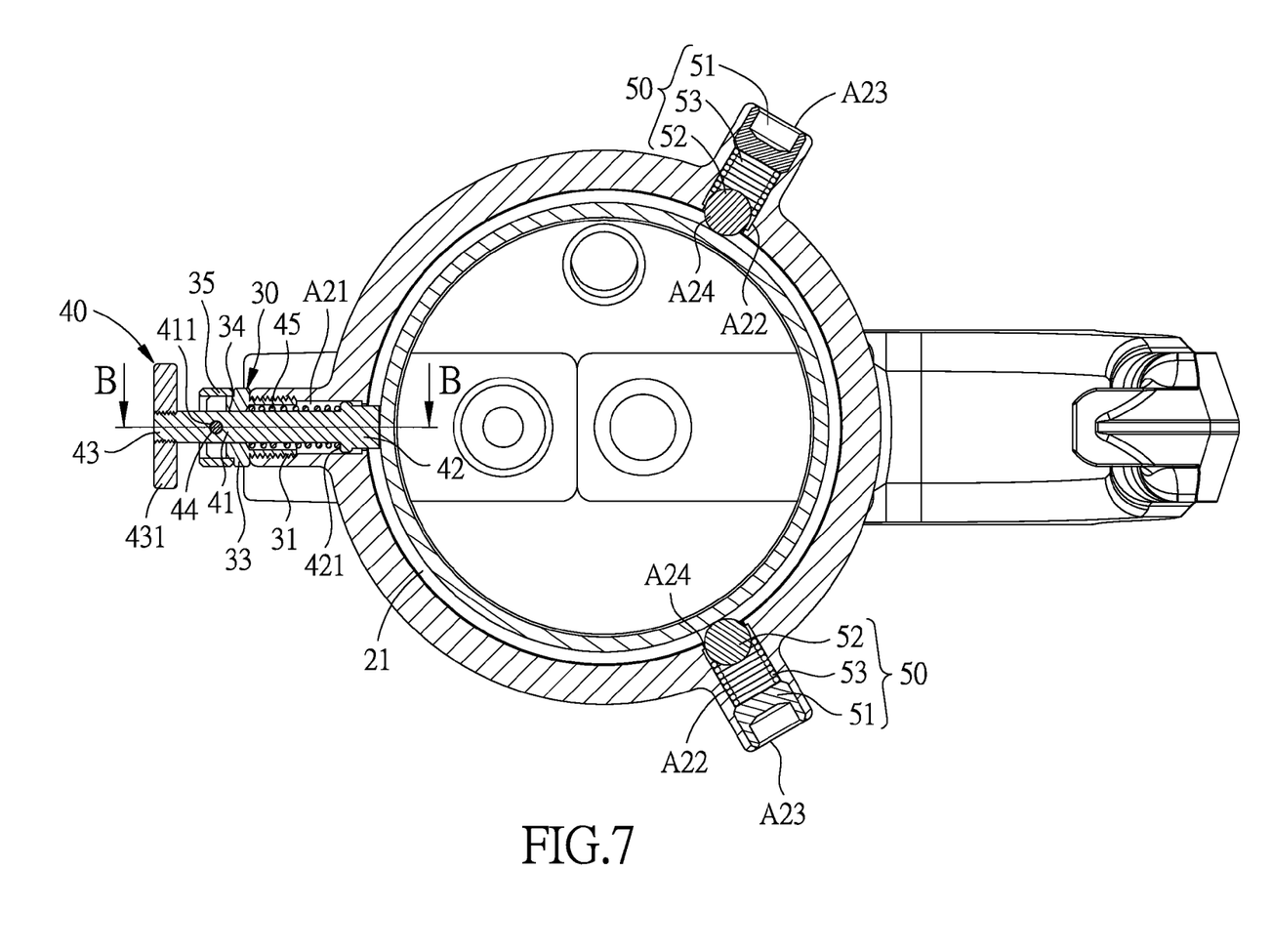
FIG. 7 is a cross sectional view of the grease gun with a quick-release end cover in accordance with the present invention, wherein the quick-release device is in a unlocked position.
Figure 8:
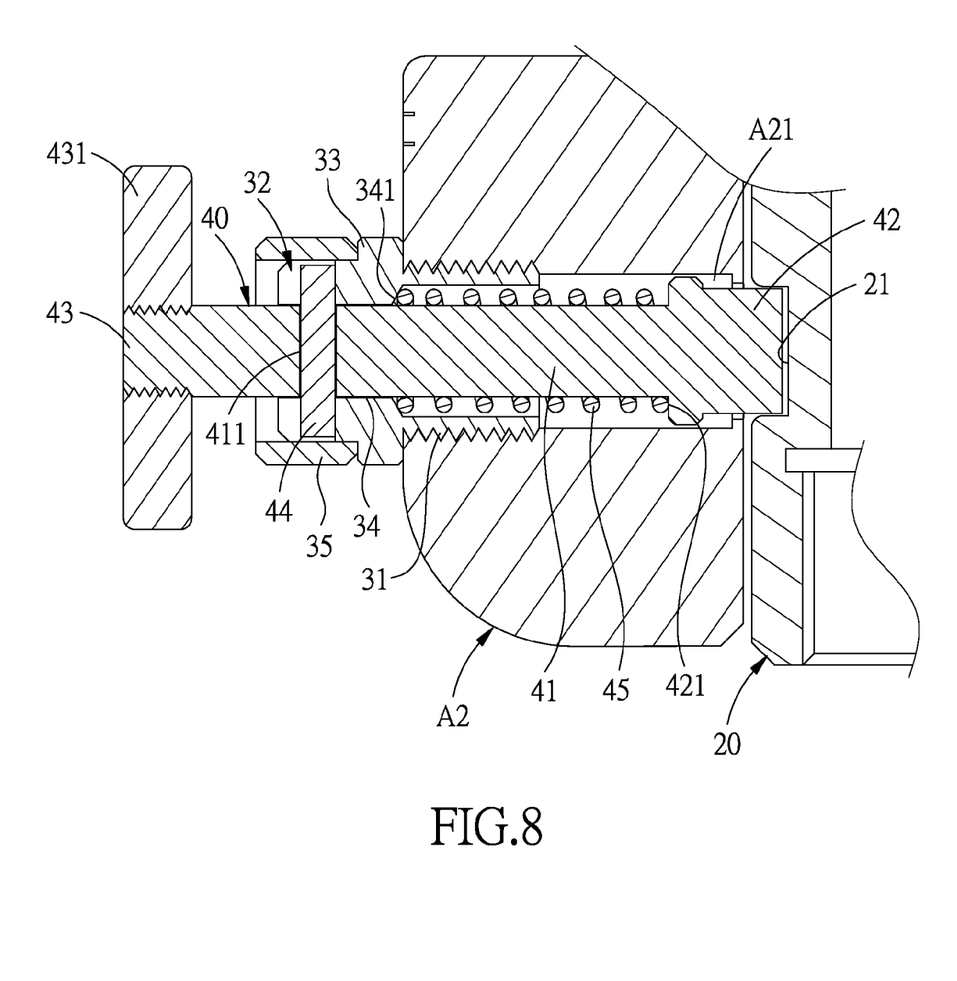
FIG. 8 is a cross sectional view taken along the line B-B of FIG. 7.

To assemble the operating end cover A2 to the barrel A1, the abutting block 42 can be disengaged from the annular groove 21 of the engaging ring 20 by repeating the above operations, then the operating end cover A2 can be assembled to the barrel A1. At this moment, it only needs to rotate the control member 40 to make the positioning pin 44 aligned with the slot 32, the compression spring 45 will push the control member 40 to make the abutting block 42 engage in the annular groove 21 of the engaging ring 20, as shown in FIGS. 7 and 8, thus locking the operating end cover A2 to the barrel A1.

In general, the grease gun A with a quick-release end cover in accordance with the present invention is easy to operate, without the problem that the grease dirties the user's hands. Besides, the arrangement of the two positioning members 50 enhances the tightness of connection between the operating end cover A2 and the barrel A1.

While we have shown and described various embodiments in accordance with the present invention, it is clear to those skilled in the art that further embodiments may be made without departing from the scope of the present invention.

What is claimed is:

1. A grease gun with a quick-release end cover comprising: a barrel, and an operating end cover and a piston end cover disposed at two ends of the barrel, the grease gun being characterized in that:
    between the operating end cover and the barrel is disposed at least one quick-release device which comprises:
    an annular groove is formed around an outer surface of one end of the barrel;
    a first hole is formed in the operating end cover and includes an outer open end located toward an outer surface of the operating end cover, and an inner open end located toward an inner surface of the operating end cover, inside the first hole is formed an annular shoulder portion, in the outer open end of the first hole is formed a slot which is defined by two symmetrical meniscus structures;
    a control member includes a shaft inserted into the first hole of the operating end cover, the shaft has one end provided with an abutting block which is disposed in the first hole, and another end formed with an operating portion, the abutting block is formed with an annular abutting portion, the shaft is further provided with a positioning pin which is located close to the operating portion, a compression spring is sleeved onto the shaft and has one end pushed against the annular shoulder portion of the first hole and another end pushed against the annular abutting portion of the abutting block, respectively, when the positioning pin moves or rotates along with the shaft to engage in the slot, the abutting block will be pushed by the compression spring to move into the annular groove of the barrel, or, when the positioning pin disengages from the slot, the abutting block will be pushed by the compression spring to move out of the slot, so as to separate the barrel from the operating end cover.

2. The grease gun with the quick-release end cover as claimed in claim 1, wherein two said quick-release devices are disposed between the barrel and the operating end cover, and the operating end cover is provided with two said first holes for insertion of two said control members.

3. The grease gun with the quick-release end cover as claimed in claim 1, wherein the quick-release device further includes at least one second hole and at least one positioning member, the second hole is formed in the outer surface of the operating end cover and includes an outer open end located toward the outer surface of the operating end cover, and an inner open end located toward the inner surface of the operating end cover, the positioning member is disposed in the second hole of the operating end cover and includes a stop block disposed at the outer open end of the second hole, a ball disposed between the inner open end of the second hole and the annular groove of the barrel, and a compression spring disposed between the stop block and the ball the ball has an outer diameter larger than an inner diameter of the inner open end of each of the second holes, so that the ball is pushed by the compression spring to move into or out of the annular groove.

4. The grease gun with the quick-release end cover as claimed in claim 1, wherein the quick-release device further includes two second holes and two positioning members, the first hole and the second holes are formed in the outer surface of the operating end cover in a spaced manner, each of the second holes includes an outer open end located toward the outer surface of the operating end cover, and an inner open end located toward the inner surface of the operating end cover, the positioning members are disposed in the second holes of the operating end cover and each include a stop block disposed at the outer open end of the second hole, a ball disposed between the inner open end of the second hole and the annular groove of the barrel, and a compression spring disposed between the stop block and the ball, the ball has an outer diameter larger than an inner diameter of the inner open end of each of the second holes, so that the ball is pushed by the compression spring to move into or out of the annular groove.

5. The grease gun with the quick-release end cover as claimed in claim 1, wherein an engaging ring is screwed to the barrel, around an outer surface of the engaging ring is formed the annular groove, with the engaging ring and the quick-release device, the engaging ring is allow to engage with or disengage from the operating end cover.

6. The grease gun with the quick-release end cover as claimed in claim 5, wherein a sealing ring is disposed between the outer surface of the engaging ring and an inner surface of the operating end cover.

7. The grease gun with the quick-release end cover as claimed in claim 1, wherein the operating portion which is screwed with a rotating button.

8. The grease gun with the quick-release end cover as claimed in claim 1, wherein the quick-release device further comprises a restricting member has one end formed with a threaded section for engaging with the outer open end of the first hole of the operating end cover, and another formed with the slot, the restricting member is further provided with an annular rib between the threaded section and the slot, inside the restricting member is formed a two-step hole which is provided with the annular shoulder portion, the annular shoulder portion is located at a conjunction between the threaded section and the annular rib and disposed in the first hole, the control member has the shaft inserted through the two-step hole of the restricting member and into the first hole of the operating end cover, the shaft has one end provided with an abutting block which is disposed in the first hole, and the compression spring has one end pushed against the annular shoulder portion of the two-step hole of the restricting member and another end pushed against the annular abutting portion of the abutting block, respectively.

9. The grease gun with the quick-release end cover as claimed in claim 8, wherein a sleeve is disposed around the slot of the restricting member.

10. The grease gun with the quick-release end cover as claimed in claim 1, wherein the shaft is further provided with an insertion hole for insertion of a positioning pin, and the insertion hole is located close to the operating portion and extends in a direction perpendicular to an axial direction of the shaft.

11. The grease gun with the quick-release end cover as claimed in claim 4, wherein the quick-release device further comprises a restricting member has one end formed with a threaded section for engaging with the outer open end of the first hole of the operating end cover, and another formed with the slot, the restricting member is further provided with an annular rib between the threaded section and the slot, inside the restricting member is formed a two-step hole which is provided with the annular shoulder portion, the annular shoulder portion is located at a conjunction between the threaded section and the annular rib and disposed in the first hole, the control member has the shaft inserted through the two-step hole of the restricting member and into the first hole of the operating end cover, the shaft has one end provided with an abutting block which is disposed in the first hole, and the compression spring has one end pushed against the annular shoulder portion of the two-step hole of the restricting member and another end pushed against the annular abutting portion of the abutting block, respectively.

12. The grease gun with the quick-release end cover as claimed in claim 11, wherein a sleeve is disposed around the slot of the restricting member.

* * * * *